March 2, 1948.  R. B. HOFFMAN  2,436,805
RADIO INDICATING SYSTEM
Filed Oct. 2, 1944  4 Sheets-Sheet 1

INVENTOR.
ROSS B. HOFFMAN
BY
*OP Morris*
ATTORNEY

March 2, 1948.　　　R. B. HOFFMAN　　　2,436,805
RADIO INDICATING SYSTEM
Filed Oct. 2, 1944　　　4 Sheets-Sheet 2

INVENTOR.
ROSS B. HOFFMAN
BY
ATTORNEY

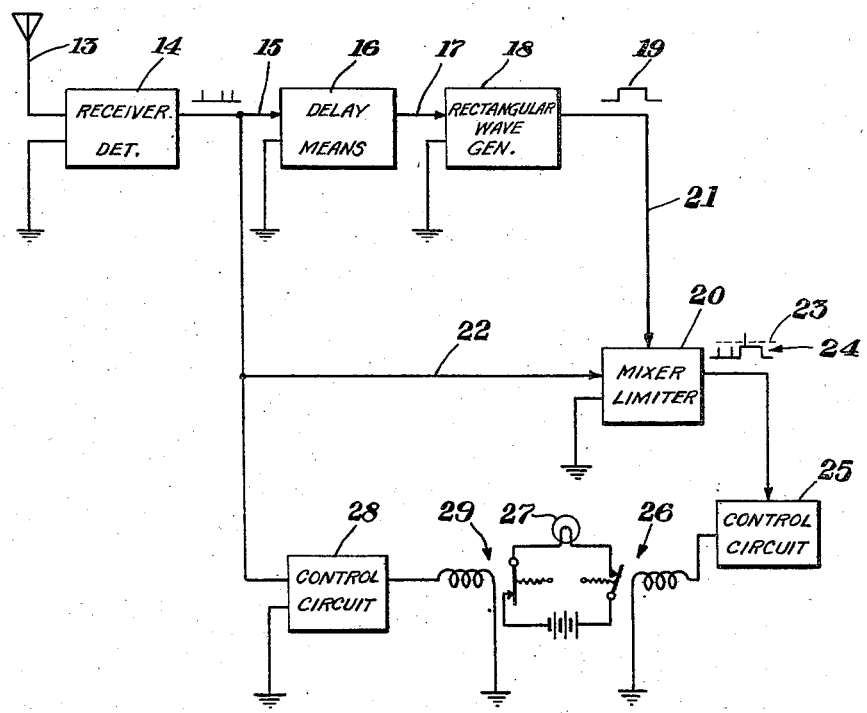

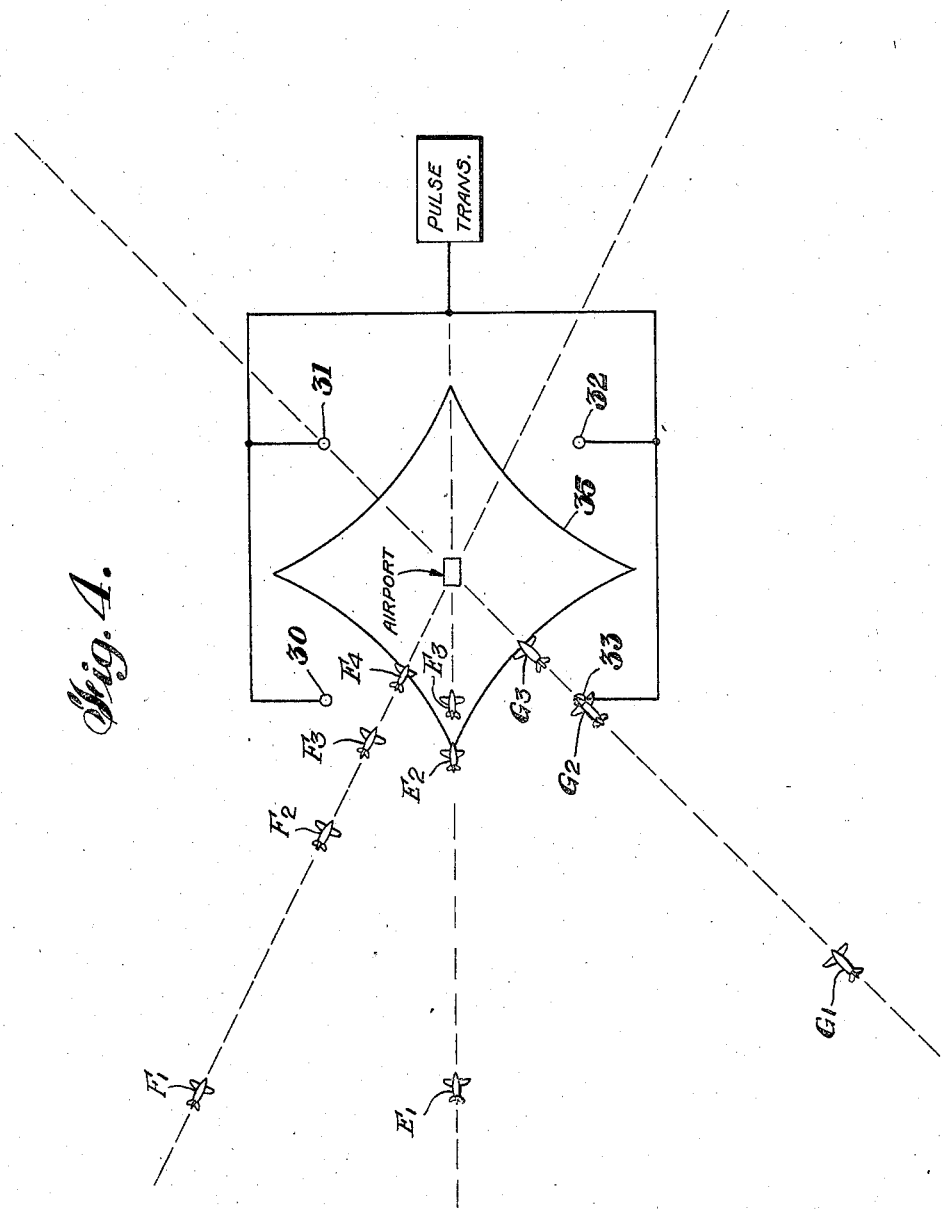

Patented Mar. 2, 1948

2,436,805

UNITED STATES PATENT OFFICE 2,436,805

RADIO INDICATING SYSTEM

Ross B. Hoffman, Glen Ridge, N. J., assignor to Federal Telephone and Radio Corporation, New York, N. Y., a corporation of Delaware Application October 2, 1944, Serial No. 556,719

6 Claims. (Cl. 250—11)

This invention relates to radio indicating systems and more particularly to systems for providing a zone indication about a given port.

In many airports there are a plurality of course lines or zones for guiding craft along different courses into and out of the port. At a heavily travelled airport, it is often necessary for the aircraft to circle while waiting for other craft to land. The zone generally defining the beacon course to the airport becomes quite narrow as it approaches the landing area and may provide insufficient space for the aircraft to circle without crossing the line into other beacon zones. It is therefore desirable to provide some system for indicating a boundary zone around the airport beyond which aircraft are not permitted to approach until they receive an indication from the control tower that it is permissible for them to come in to land.

It is an object of my invention to provide a radio system which will provide a zone about a given area such as an airport indicating the limit to which craft may approach without approval.

It is a further object of my invention to provide a radio system wherein a pulse pattern is produced over an area including an airport, the spacing of the pulses at a predetermined boundary serving to define a zone about the airport.

It is a still further object of my invention to provide a transmitter arrangement for defining in space a predetermined radiation pattern about an airport and receiver means for receiving the energy of this predetermined pattern and producing an indication of the boundary from the received energy.

It is a still further object of my invention to provide a receiver for use with a system in which a zone is defined by a predetermined pulse pattern to indicate the relative position of the receiver with respect to the boundaries defined by such pattern.

According to a feature of my invention, I provide a plurality of spaced radiators at a predetermined distance from an airport. These radiators are energized in predetermined time relationship to transmit pulse energy. The pulses from the separate spaced radiators will therefore form in space a pattern, the overall spacing between the most widely separate pulses of which varies as the airport is approached. If the radiators are energized simultaneously, the pulse spacing will be substantially zero at the center of the airport and will increase variable amounts on departure radially from the airport. By selection of a predetermined spacing, a boundary condition defining a given area or zone about the airport may be produced. The aircraft are provided with receiver indicator equipment to receive these pulses and to produce an indication of the overall pulse spacing so that the boundary of the given area may be ascertained. The craft may therefore be warned when they have approached closer to the airport than is permissible so that they will turn back and circle in an area outside of this boundary.

A better understanding of my invention and the objects and features thereof may be had from the particular description of specific embodiments thereof made with reference to the accompanying drawings, in which:

Fig. 3 is a block circuit diagram of a receiver arrangement suitable for use with a beacon in accordance with my invention;

Fig. 4 is a plan view of a modified zone beacon arrangement utilizing four radiators.

Figure 1:
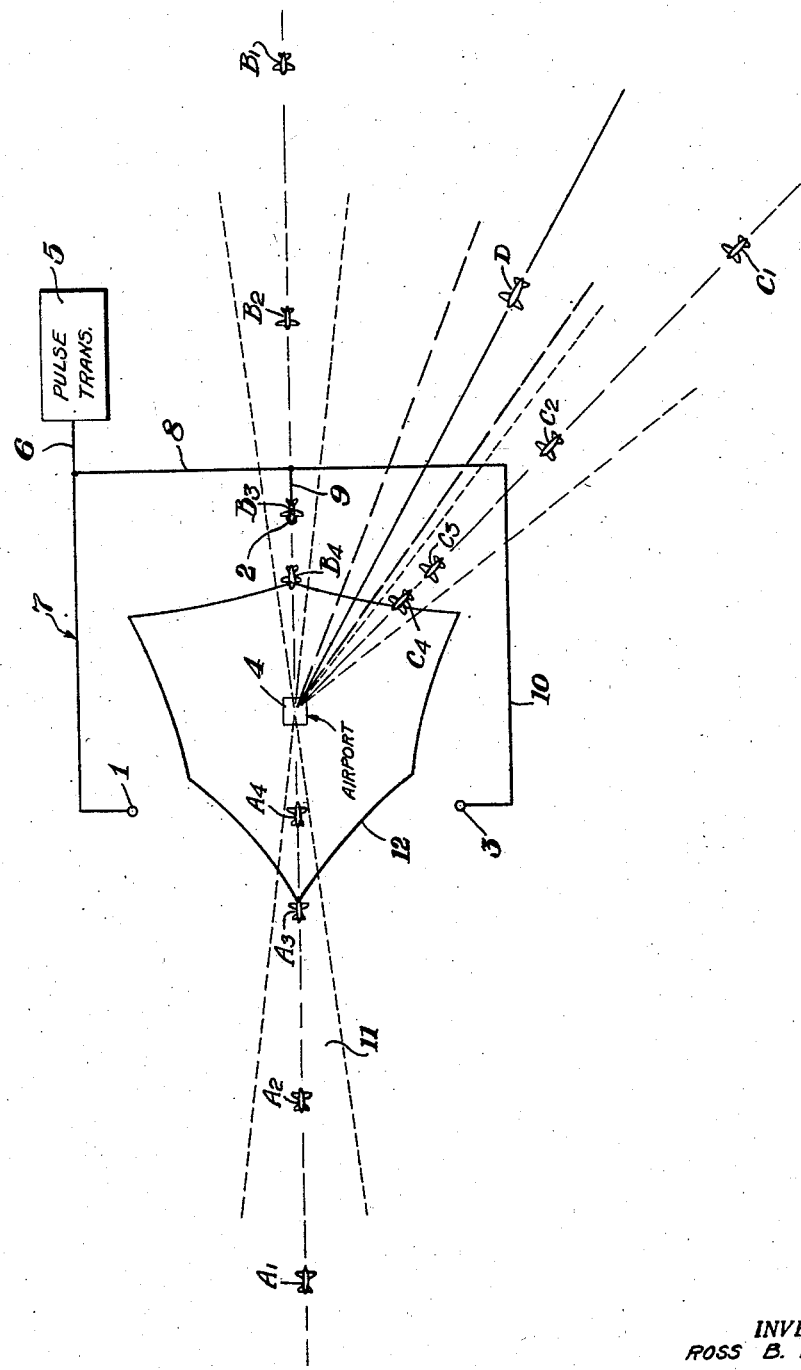
Fig. 1 is a plan view of an airport and boundary beacon arrangement illustrating an embodiment of my invention.

Turning first to Fig. 1, a plurality of radiators 1, 2 and 3 are shown spaced at a given distance from an airport 4. Preferably radiators 1, 2 and 3 are equally spaced from airport 4 and from one another to define the apices of an equilateral triangle. A transmitter means 5 for producing pulses is coupled to antennas 1, 2 and 3 over lines 6, 7, 8, 9 and 10. Preferably these lines are so chosen that antennas 1, 2 and 3 are energized simultaneously by pulses from transmitter 5. It is clear, however, that with a different timing of the energization the system will still operate but will produce a different form of pattern. If we assume an airplane A approaching over course 11, it will be found that the pulse spacing of pulse energy received on the craft from radiators 1, 2 and 3 will vary so that different patterns will be produced at points A1, A2, A3 and A4.

Figure 2:
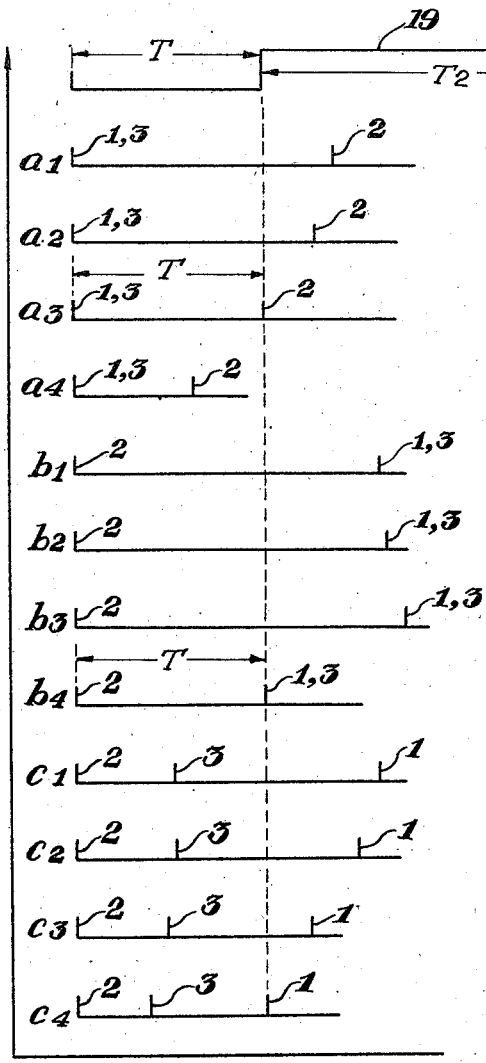
Fig. 2 is a set of curves used to explain the operation of the system of Fig. 1.

The pulse spacing of pulses from 1, 2 and 3 are indicated in Fig. 2 by curves $a1$, $a2$, $a3$ and $a4$. It will be noted that at the particular point $a3$ which is on the circumference of a circle drawn through radiators 1, 2 and 3, the pulses arrive at the receiver with a predetermined given spacing T. If this distance T is chosen as a standard then at all points around the airport where the same overall spacing of the pulses prevails may serve to define a given boundary beyond which aircraft approaching the port should not pass. Because of the difference in the pulse patterns produced in different directions from the three antenna units, this predetermined boundary will not be in the form of a circle but will have a different shape as indicated by outline 12 of Fig. 1.

Craft B approaching the airport from the opposite direction from craft A will have a series of predetermined pulse patterns at points B1, B2, B3 and B4 indicated by curves b1, b2, b3 and b4. It will be noted in this case that B3 coincides with the position of antenna 2 which is on the periphery of a circle passing through the antennas and through point A3. However, at this point the apparent overall spacing of the pulses from this direction reach their maximum extent. After passing these points, the spacing reduces quite rapidly until at point B4 they reach the same overall spacing T as the spacings at point A3.

Another craft C incoming from a still different direction as shown at C1, C2, C3 and C4 will have variable spaced pulse patterns as shown at c1, c2, c3 and c4 of Fig. 2. Here again the plane passes beyond the circle defined by antennas 1, 2 and 3 before reaching this boundary condition but not so far as did plane B. A fourth plane D approaching the airport will reach the boundary at still a different portion as defined by curve 12.

It will be noted that adjacent courses such as followed by planes C and D will be so defined by the boundary line 12 that sufficient room for maneuvering the planes outside of the area, but still within the guiding zone, will be provided. If a different timing of the transmissions from antennas 1, 2 and 3 is provided then the boundary defined will take some other form than shown in 12. However, the system will provide a definite boundary limit beyond which incoming planes shall be warned not to pass.

Preferably, the pulses from transmitter 5 are so timed that a sufficiently wide spacing in time will occur between each transmitted pulse pattern to avoid any possible confusion. To this end the transmission period should be greater than the maximum spacing of any of the pulses of the pattern. This is particularly true if the receiving arrangement is adapted to be initiated into operation by the first received pulse of the pulse pattern.

A receiver for use with the system defined in my invention is shown by way of example in Fig. 3 of the drawing. According to this arrangement, the pulses are received on antenna 13 and amplified and detected in receiver-detector 14. In the output thereof will accordingly be produced the various pulse patterns such as shown in Fig. 2. The pulses as received are preferably applied over line 15 to delay means 16 which will produce a delay equal to the time spacing T at the boundary condition. The first pulse of the pattern will be passed from delay means 16 over a line 17 to a rectangular wave generator 18 which serves to produce the rectangular pulse 19. As shown in Fig. 2, the rectangular wave generator is preferably of the type which, once triggered into operation, will maintain substantially a constant level for a period T2 at least equal to the widest time spacing between the pulses of the patterns. As a consequence, none of the delayed pulses passing through delay means 16 except the first received will have any effect on the rectangular wave generator. Wave 19 of rectangular wave generator 18 is applied to a mixer limiter 20 over line 21 and the received pulses from the output of detector 14 are also applied over a line 22 to mixer limiter 20. The received pulses arriving within the interval T of delay means 16 will not be mixed with the rectangular pulse 19 and therefore will not reach clipping level 23 of the composite pulse shown at 24. However, the other pulses spaced beyond these levels will be boosted by mixing with pulse 19 and accordingly will pass on to control circuit 25. So long as the plane remains outside the boundary 12, pulses will be applied to control circuit 25. However, once the plane reaches this boundary or passes it the pulses will all fall within the time interval T and pulses will no longer be applied to control circuit 25.

Preferably, control circuit 25 includes a circuit with a time constant sufficiently long to energize relay 26 but of insufficient duration to maintain the relay continuously operated for the period between reception of pulse groups. Accordingly, the relay 26 will alternately operate causing a lamp 27 in the indicator circuit to flash on and off. So long as the craft maintains a flight position outside of this boundary area, light 27 will continue to flash. However, once the craft has passed this boundary level, all of the received pulses will fall within time interval T during which the delay means is operating and none will be passed to control circuit 25. Accordingly, the light will then show a steady glow indicating that the pilot has passed the boundary and should return back.

This indicator circuit thus serves to provide the desired indications in the area adjacent the airport. However, when the craft is out of range of the transmissions from antennas 1, 2 and 3, lamp 27 would also show a steady light. To avoid this ambiguity in indications, the received pulses in the output of receiver-detector 14 are applied to a second control circuit 28. This second control circuit 28 has a time constant sufficient to maintain its relay 29 operated continuously so long as the receiver is in a position to receive pulse energy from any of the transmitting antennas. Relay 29 serves to complete the circuit for lamp 27 by closing its contacts against a front contact member. Upon departure completely away from the airport and in case of failure of the transmitter to operate, lamp 27 will be dark indicating that no boundary indicating signals are being received.

In the above described example, the simplest form of boundary indicating system utilizing three radiators is disclosed. It is clear, however, that the principles of my invention are applicable to any number of antennas as desired.

Figure 5:
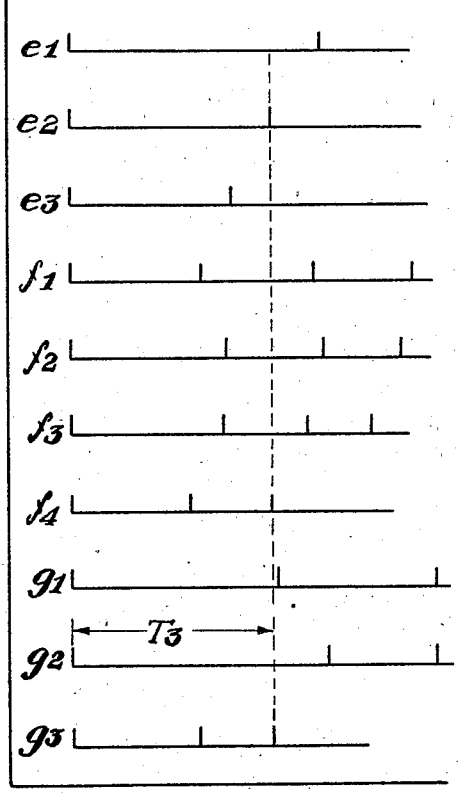
Fig. 5 is a set of curves used in explaining the operation of the system of Fig. 4.

In Fig. 4 is shown a system wherein there are provided four radiating antennas 30, 31, 32 and 33 energized from a common pulse transmitter 34. If these antennas are also simultaneously energized, planes E, F and G approaching the airport will encounter their various pulse patterns at points E1, E2 and E3; F1, F2, F3 and F4; and G1, G2 and G3 as indicated by the corresponding curves e1, e2 and e3; f1, f2, f3 and f4; g1, g2 and g3 of Fig. 5. In this instance, a generally square boundary pattern shown at 35, Fig. 4, will result instead of the triangular pattern obtained in connection with the system of Fig. 1. By again choosing a period T3 within which the pulses must fall to provide boundary condition, a receiver similar to that shown in Fig. 3 may be used on the craft to indicate their position relative to the forbidden area.

It is clear that various other patterns may be readily provided by utilizing different numbers of radiating antennas spaced about the airport. The distance of boundaries such as 12 and 35 from the airport may be controlled by suitable choice of the spacing of the radiating antennas therefrom.

It should also be clearly understood that other forms of indicators than the simple lamp circuit shown in Fig. 3 may be used if desired. A cathode ray indicator, for example, might be used to visually disclose the spacing between pulses received. Also it is clear that many other forms of means suitable for measuring this form of particular spacing may readily occur to those skilled in the art.

It should be understood that the particular illustrations shown herein are given merely by way of example and are not to be considered as limitations on the scope of my invention as defined in the objects thereof and the accompanying claims.

I claim:

1. In a radio navigation system for aircraft incoming over a plurality of different courses to a common airport, a system for indicating the limit to which aircraft may approach said airport, comprising a plurality of radiators spaced about said airport, a radio pulses transmitter, means for coupling said transmitter to said antennas to simultaneously transmit the radio pulses to provide a composite pulse pattern about said airport, the transmitted pulses having a given spacing in a regular pattern about said airport, and indicator means on said aircraft for indicating the effective time spacing of the received pulses to provide an indication of said limit of approach, said indicator means comprising means responsive to the pulse first received for initiating a deblocking wave having a duration substantially equal to the greatest spacing of the pulses of said composite pattern, delay means for giving to said deblocking wave a delay substantially equal to said given spacing, mixer means for mixing said deblocking wave and said received pulses to provide a resultant wave, and an indicator responsive to said resultant wave.

2. In a radio navigation system for aircraft incoming over a plurality of different courses to a common airport, a system for indicating the limit to which aircraft may approach said airport, comprising a plurality of radiators symmetrically spaced about said airport on a circle defining the maximum extent of said limit, a radio pulse transmitter, means for coupling said transmitter to said antennas to simultaneously transmit the radio pulses to provide a composite pulse pattern about said airport, the transmitted pulses having a given spacing in a regular pattern about said airport, said pulse transmitter generating said pulses with a spacing greater than the maximum time spacing of pulses from said transmitters, receiver means on said aircraft for receiving said transmitted pulses, and indicator means on said aircraft for indicating the effective time spacing of the received pulses in space to provide an indication of said limit of approach.

3. In a radio navigation system for aircraft incoming over a plurality of different courses to a common airport a system for indicating the limit to which aircraft may approach said airport, comprising a plurality of radiators symmetrically spaced about said airport on a circle defining the maximum extent of said limit, a radio pulse transmitter, means for coupling said transmitter to said antennas to simultaneously transmit the radio pulses to provide a composite pulse pattern about said airport, the transmitted pulses having a given spacing in a regular pattern about said airport, said pulse transmitter generating said pulses with a spacing greater than the maximum time spacing of pulses from said transmitter, receiver means on said aircraft for receiving said transmitted pulses, and indicator means on said aircraft for indicating the effective time spacing of the received pulses in space to provide an indication of said limit of approach, said indicator means comprising means responsive to the pulse first received for initiating a deblocking wave having a duration substantially equal to the greatest spacing of the pulses of said composite pattern, delay means for giving said deblocking wave a delay substantially equal to said given spacing, a mixer circuit for combining said deblocking wave and said received pulses to provide a resultant wave, and an indicator responsive to said resultant wave.

4. In a radio navigation system for aircraft incoming over a plurality of different courses to a common airport, a system for indicating the limit to which aircraft may approach said airport, comprising a plurality of omnidirectional radiators symmetrically spaced about said airport on a circle defining the maximum extent of said limit, a radio pulse transmitter, and means for coupling said transmitter to said antennas to simultaneously transmit the radio pulses to provide a composite pulse pattern about said airport, the transmitted pulses having a given overall spacing in a regular pattern about said airport, said pulse transmitter generating said pulses with a spacing greater than the maximum time spacing of pulses from said transmitters, receiver means on said aircraft for receiving said transmitter pulses, and indicator means on said aircraft for indicating the effective time spacing of the received pulses to provide an indication of said limit of approach, said indicator means comprising means responsive to the pulse first received for initiating a deblocking wave having a duration substantially equal to the greatest spacing of the pulses of said composite pattern, delay means for giving to said deblocking wave a delay substantially equal to said given spacing, a mixer means for mixing said received pulses and said deblocking wave to provide a resultant wave, an indicator responsive to said resultant wave, and means in said indicator responsive to all said received pulses arriving within the delay period of said delay means for producing an indication that the craft has approached beyond said regular pattern.

5. A receiver circuit for producing an indication to define a given area, the boundaries of which are defined by predetermined time spacing of the pulses of the pattern having pulse-time spacing variable with the distance from the center of the area, comprising means for receiving said pulses, wherein said last-named means comprises means responsive to the first received pulse of the pattern for initiating a deblocking wave having a duration substantially equal to the greatest spacing of the pulses of said pattern, delay means for giving to said deblocking wave a delay substantially equal to said predetermined spacing, a mixer circuit for combining said deblocking wave and said received pulses to provide a resultant wave, and an indicator responsive to said resultant wave.

6. A receiver circuit for producing an indication to define a given area, the boundaries of which are defined by predetermined time spacing of the pulses of the pattern having pulse-time spacing variable with the distance from the center of the area, comprising means for receiving said pulses, wherein said last-named means comprises means responsive to the first received pulse of the pattern for initiating a deblocking wave having a duration substantially equal to the greatest spacing of the pulses of said pattern, delay means for giving to said deblocking wave a delay substantially equal to said predetermined spacing a mixer circuit for combining said deblocking wave and said received pulses to provide a resultant wave, an indicator responsive to said resultant wave, and means in said indicator responsive to all said received pulses arriving within the delay period of said delay means for producing an indication that the receiver is within said boundaries.

ROSS B. HOFFMAN.

REFERENCES CITED

The following references are of record in the file of this patent:

UNITED STATES PATENTS

| Number    | Name          | Date           |
|-----------|---------------|----------------|
| 2,130,913 | Tolson        | Sept. 20, 1938 |
| 2,226,860 | Greig         | Dec. 31, 1940  |
| 2,007,076 | Cohen et al.  | July 2, 1935   |
| 2,216,707 | George        | Oct. 1, 1940   |
| 2,267,715 | Bowen         | Dec. 30, 1941  |
| 2,279,246 | Podliasky et al. | Apr. 7, 1942 |
| 2,403,626 | Wolff et al.  | July 9, 1946   |
| 2,406,468 | Loughlin      | Aug. 27, 1946  |
| 2,407,287 | Labin         | Sept. 10, 1946 |
| 2,403,429 | Anderson      | July 9, 1946   |
| 2,403,600 | Holmes et al. | July 9, 1946   |
| 2,406,970 | Smith         | Sept. 3, 1946  |

OTHER REFERENCES

A. P. C. application to De France, Serial No. 429,583, published June 15, 1943.